(12) United States Patent
Kempf et al.

(10) Patent No.: US 8,433,155 B2
(45) Date of Patent: Apr. 30, 2013

(54) GAUSSIAN NOISE REJECTION WITH DIRECTIONAL VARIANCE CAPABILITIES FOR USE IN IMAGE PROCESSING

(75) Inventors: Jeffrey Matthew Kempf, Dallas, TX (US); Rajeev Ramanath, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1279 days.

(21) Appl. No.: 11/617,096

(22) Filed: Dec. 28, 2006

(65) Prior Publication Data
US 2008/0159645 A1 Jul. 3, 2008

(51) Int. Cl.
*G06K 9/36* (2006.01)

(52) U.S. Cl.
USPC ............ 382/275; 382/261; 382/264; 382/272

(58) Field of Classification Search ........... 382/254–275
See application file for complete search history.

(56) References Cited

U.S. PATENT DOCUMENTS

| 5,771,318 | A | 6/1998 | Fang et al. |
|---|---|---|---|
| 7,076,114 | B2 | 7/2006 | Westerman |
| 7,280,703 | B2 | 10/2007 | Gallagher et al. |
| 7,512,257 | B2 | 3/2009 | Hwang et al. |
| 2005/0135699 | A1 | 6/2005 | Anderson |
| 2005/0244052 | A1 | 11/2005 | Keshet |
| 2005/0276510 | A1 | 12/2005 | Bosco |
| 2006/0103765 | A1 | 5/2006 | Zhou |
| 2008/0159649 | A1 | 7/2008 | Kempf |

OTHER PUBLICATIONS

Wen Jiang et al, Applications of a bilaeral denoising filter in biological electron microscopy, Journal of Structural Biology 2003.*
Copending U.S. Appl. No. 11/617,885 including all Office Actions and papers submitted by the applicant.

* cited by examiner

*Primary Examiner* — Chan S Park
*Assistant Examiner* — Mark Roz
(74) *Attorney, Agent, or Firm* — Warren L. Franz; Wade J. Brady, III; Frederick J. Telecky, Jr.

(57) ABSTRACT

The noise reduction filter is intensity adaptive and incorporates directional variances of input images.

7 Claims, 6 Drawing Sheets

GAUSSIAN NOISE REJECTION WITH DIRECTIONAL VARIANCE CAPABILITIES FOR USE IN IMAGE PROCESSING

TECHNICAL FIELD

The technical field of the examples to be disclosed in the following sections relates to the art of image processing and more particularly to the art of noise rejection in digital image processing.

BACKGROUND

Digital images and videos carry noises resulting from a variety of noise sources such as image and video capture hardware and post-capture image processing techniques. Gaussian noise, which is a type of noise with a Gaussian amplitude distribution, is one of the major noise components in current digital images and image processing techniques. Specifically, an amount of noise is added to every part of the image. Each pixel in the image is changed from its original value by a small amount. Taking a plot of the amount of distortion of a pixel against the frequency with which it occurs produces a Gaussian distribution of noise.

Image de-noising is a technique to reduce or eliminate noises in images for many purposes, such as aesthetic visual experience and practical applications (i.e. computer imaging). Conventional de-noising techniques, such as spatial noise reduction techniques and temporal noise reduction techniques, employ edge-adaptive and motion adaptive algorithms to maintain sharpness of images. However, these existing techniques, including techniques for reducing including Gaussian noise, either fail to maintain high frequency details in textured detailed structures or are costly, in addition to possibly introducing artificial effect such as unwanted motion blurring.

SUMMARY

As an example, a method for processing a noise contaminated image having an array of image pixels is disclosed herein. The method comprises: assembling a filter having an array of filtering coefficients, wherein a strength of each coefficient is determined based on a value of an image pixel; and a characteristic of the filter is determined based on a directional variance of the image pixels; and processing the image pixels with the assembled filter.

In another example, a computer-readable medium having a set of computer executable instruction for performing a method for processing a noise contaminated image having an array of image pixels is disclosed, wherein the method comprises: assembling a filter having an array of filtering coefficients, wherein a strength of each coefficient is determined based on a value of an image pixel; and a characteristic of the filter is determined based on a directional variance of the image pixels; and processing the image pixels with the assembled filter.

In yet another example, a device for processing a noise contaminated image having an array of pixel images is disclosed. The device comprises: a filter means having a filtering matrix composed of an array of filtering coefficients, wherein a strength of each coefficient is determined based on a value of an image pixel; and a characteristic of the filter is determined based on a directional variance of the image pixels; and means for processing the image pixels with the assembled filter.

In still yet another example, a device for processing a noise contaminated image having an array of image pixels is disclosed herein. The device comprises: a noise variance unit for estimating a noise floor of the image; a directional variance calculation unit for calculating a set of directional variances of the image; and a filter unit connected to an output of the noise variance estimation unit and an output of the directional variance calculation unit such that an intensity of each filtering coefficient of the filter of the filter unit is determined by a value of the image pixel; and a characteristic of the filter is determined based on the calculated directional variance and the noise floor.

In yet another example, a display system is disclosed herein. The system comprises: an illumination system for providing light; a spatial light modulator having an array of individually addressable pixels for modulating the light based on a set of image data; and a control unit comprising an image processor that comprises a device for processing an input image, wherein the device comprises: a noise variance unit for estimating a noise floor of the image; a directional variance calculation unit for calculating a set of directional variances of the image; and a filter unit connected to an output of the noise variance estimation unit and an output of the directional variance calculation unit such that an intensity of each filtering coefficient of the filter of the filter unit is determined by a value of the image pixel; and a characteristic of the filter is determined based on the calculated directional variance and the noise floor.

DETAILED DESCRIPTION OF EXAMPLES

Digital images can be processed using an intensity adaptive and directional variance filter such that texture and detailed spatial structures, especially high frequency details in images and videos, can be maintained after filtering. Moreover, motion blurring effects such as appear in processed images with conventional filtering techniques can be avoided. The filter comprises a set of coefficients whose intensities are determined based on the pixel values of the image to be processed; and do not depend upon spatial locations of the image pixels. Characteristics of the filter are based on directional variances. The filter can be in various forms, one of which is a Gaussian filter.

Mathematical Basis

In two dimensions, an isotropic (i.e. circularly symmetric) Gaussian function has the form as shown in equation 1:

$$G(x, y) = \frac{1}{2\pi\sigma^2} e^{-\frac{x^2+y^2}{2\sigma^2}}. \quad \text{(Eq. 1)}$$

A noise contaminated image can be mathematically expressed as:

$$I(i,j) = X(i,j) + n(i,j) \quad \text{(Eq. 2),}$$

wherein $I(i,j)$ represents the contaminated image; $X(i,j)$ represents the uncontaminated image; $n(i,j)$ represents noise; and i,j are pixel coordinates. Noise $n(i,j)$ has a Gaussian distribution with zero mean and variance $\sigma_n^2$. The de-noising problem can be interpreted as how to restore $X(i,j)$ from $I(i,j)$. Given the Gaussian distribution property, the total variance $\sigma_t^2$ is the summation of variance $\sigma_X^2$ of the uncontaminated image and variance $\sigma_t^2$ of the noise, as expressed in equation 3:

$$\sigma_t^2 = \sigma_X^2 + \sigma_n^2 \quad \text{(Eq. 3).}$$

The noise filtering process can be mathematically expressed as:

$$X'(i,j) \approx X(i,j) = f[I(i,j)] \quad \text{(Eq. 4),}$$

wherein $X'(i,j)$ is the filtered image that is approximately equal to the ideal uncontaminated image $X(i,j)$, and $\theta$ is the transfer function of the filter. In accordance with the invention, coefficients of the transfer function $f$ are intensity adaptive and are determined by the directional variances of the input image, which will be discussed below.

Figure 1:
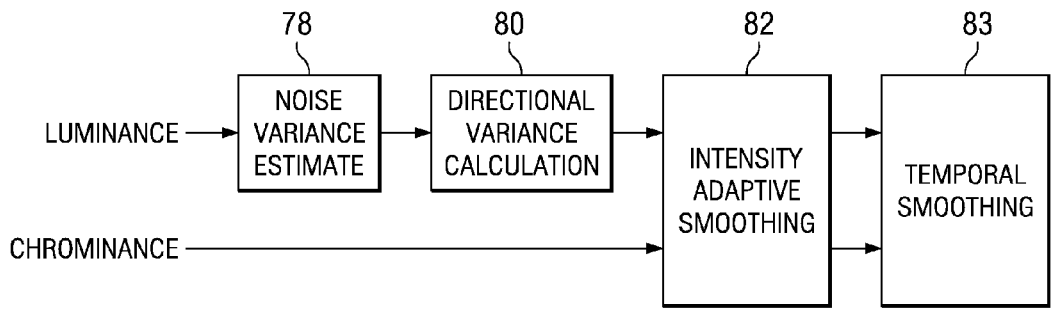
FIG. 1 is a diagram illustrating the Gaussian noise reducing algorithm.

Referring to FIG. 1, the algorithm for reducing Gaussian noise in accordance with an example of the invention is illustrated. The algorithm comprises noise variance estimation module 78 for estimating noise levels, especially the noise floor of the input image. Directional variance calculation module 80 is designated to calculate variances of the input image. The noise variance and directional noise variance are calculated preferably (though not required) only on the luminance (intensity) component of the input image. The estimated noise variances including the noise floor and the calculated directional noise variances are delivered to intensity adaptive smoothing module 82 to assemble a smoothing filter. The smoothing filter can then be applied to the input image, preferably on both luminance and chrominance components of the input image, to reduce noises therein. As an optional additional feature, a temporal smoothing module 83 can be provided following the intensity adaptive smoothing module for temporally smoothing the image.

Figure 2:
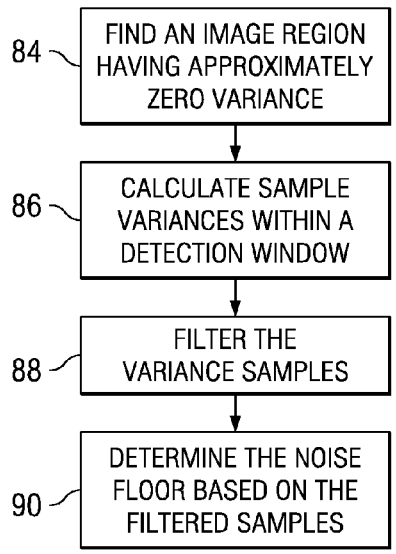
FIG. 2 is a flow chart showing the steps executed for reducing Gaussian noise.
Figure 3B:
FIG. 3a and FIG. 3b show a method of determining a noise floor.
Figure 3A:
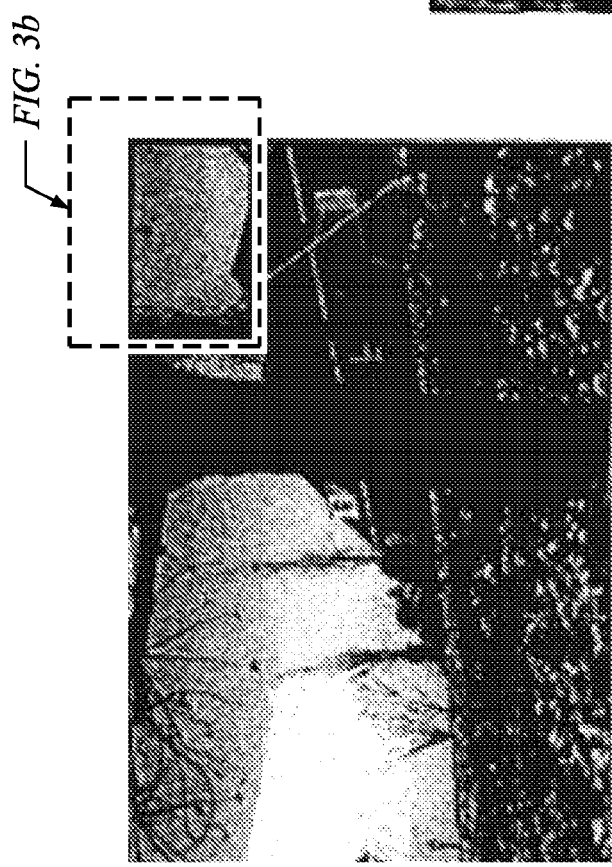

Noise variance estimation module 78 estimates the variance by finding the minimum variance in an image region. A flow chart showing an exemplary estimation process is illustrated in FIG. 2. Referring to FIG. 2, the estimation process starts with finding an image region that has approximately zero variance in luminance (intensity) components, such as a sky, wall, or other image region with substantially monotonic features. FIG. 3a shows an exemplary image with noise contamination. FIG. 3b shows an exploded image of a portion of the sky region in FIG. 3a, the region from which the image variance can be estimated. In the image region with substantially zero variance, the total image variance $\sigma_t^2$ is approximately the noise variance $\sigma_n^2$ of the image region, as expressed in equation 5:

$$\sigma_t^2 = \sigma_X^2 + \sigma_n^2 = 0 + \sigma_n^2 = \sigma_n^2 \quad \text{(Eq. 5).}$$

Figure 4:
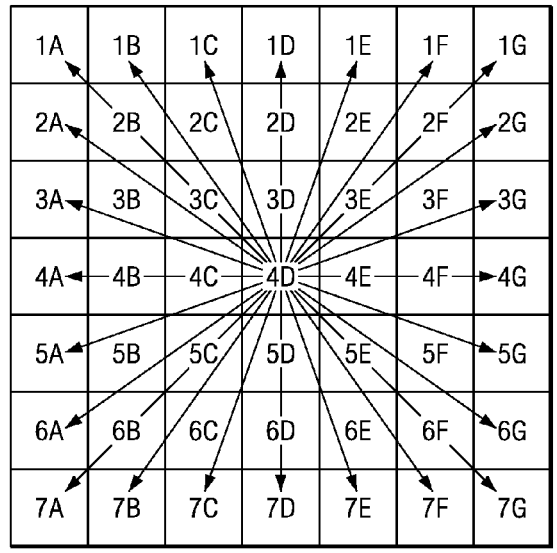
FIG. 4 illustrates a method of calculating directional variances.

For calculating the total image variance $\sigma_t^2$ (step 86 in FIG. 2), a two-dimensional detection window of N×N pixels is defined, with N being any suitable integer such as 3 and 7. In an example of the invention, a 3×3 or 7×7 (e.g. as shown in FIG. 4) detection window is used. A sample variance is calculated for the pixels in the detection window using equation 6; and a set of sample variances is calculated for a set of detection windows covering the selected image region.

$$\sigma^2 = \frac{\sum (x-\mu)^2}{(N-1)}, \quad \text{(Eq. 6)}$$

wherein $\mu$ is the mean; and T is the total number of discrete values.

The set of sample variances is processed using a maximum filter having a one-column matrix 1×M with M larger than N of the detection window (step 88 in FIG. 2). The maximum filter finds the maximum M values from the input data set. For example, the input data set (e.g. variances) of {1, 2, 3, 4, 5, 6, 7, 8, 9, 10} becomes an output data set of the maximum filter of {3, 4, 5, 6, 7, 8, 9, 10, 10, 10}. In accordance with an example of the invention, variances are not calculated for pixel intensity values close to the extremes of the dynamic range (a.k.a. contrast ratio) in order to prevent artificially low sample variances.

Given the calculated variances and maximally filtered variances, the global minimum of all maximally filtered sample variances is set as the noise floor $\sigma_n^2$.

To prevent artificially high sample variances from gradients and/or edges of images features, directional sample variances are calculated for the detection window using equation 6. As an example, a 3×3 detection window with pixel intensity data is:

| 242 | 124 | 116 |
| 59  | 227 | 5   |
| 155 | 194 | 209. |

Directional variances can be calculated along four directions of 0°, 45°, 90°, and 135° as follows: The directional mean values can be calculated as:

$$0°\mu = (59+227+5)/3 = 97,$$

$$45°\mu = (116+227+155)/3 = 166,$$

$$90°\mu = (124+227+194)/3 = 181.7, \text{ and}$$

$$135°\mu = (242+227+209)/3 = 286.7.$$

The directional variance can be calculated as:

$$0°\sigma^2 = ((59-97)^2 + (227-97)^2 + (5-97)^2)/2 = 13404,$$

$$45°\sigma^2 = ((116-166)^2 + (227-166)^2 + (155-166)^2)/2 = 3171,$$

$$90°\sigma^2 = ((124-181.7)^2 + (227-181.7)^2 + (194-181.7)^2)/2 = 2766, \text{ and}$$

$$135°\sigma^2 = ((242-286.7)^2 + (227-286.7)^2 + (209-286.7)^2)/2 = 273.$$

Given the calculated directional variances, directional sample standard deviations $\sigma_s$ that are the square root of the sample variance $\sigma_s^2$ are calculated; and the minimum directional sample standard deviation $\sigma_{min}$ is identified. All directional sample standard deviations $\sigma_s$ satisfying equation 7 are then identified:

$$\sigma_s \leq \alpha \times \sigma_{min} \quad \text{(Eq. 7),}$$

wherein α is a pre-determined constant, which can be 1.25. Constant α can also have other values, preferably larger than 1. A general form of equation 7 can be expressed as:

$$\sigma \leq f(\sigma_{min}),$$

wherein $f$ is a transfer function which can be of any suitable form. The total image variance $\sigma_t^2$, as expressed in equation 5, is then calculated from all those directional sample variances $\sigma_s^2$ that satisfy equation 7.

With the estimated noise floor $\sigma_n^2$ and sample directional variance $\sigma_t^2$ determined, a Gaussian filter of intensity adaptive smoothing module 82 in FIG. 1 can be determined. Given the fact that a 99.99% confidence interval, which specifies the width of the Gaussian distribution of equation 1, is equal to the sum of the mean $\mu \pm 3\sigma$, it can be determined that a 99.99% confidence interval for an altered noisy object in the image is equal to $\mu_o \pm 3\sigma_t$; and a 99.99% confidence interval for an uncontaminated image object is equal to $\mu_o \pm 3 \times \sqrt{(\sigma_t^2 - \sigma_n^2)}$. Accordingly, the Gaussian distribution width can be expressed as $\Delta W = 6\sigma_t - 6 \times \sqrt{(\sigma_t^2 - \sigma_n^2)}$. The standard deviation $\sigma_f^2$ of the Gaussian filter is set to be proportional to $\Delta W$. The Gaussian filter coefficients s can be defined as:

$$s = \frac{e^{-\frac{\Delta E^2}{2\sigma_f^2}}}{\sum e^{-\frac{\Delta E^2}{2\sigma_f^2}}}, \quad \text{(Eq. 8)}$$

wherein $\Delta E$ is the difference between intensities of the center pixel and surrounding pixels.

Figure 5:
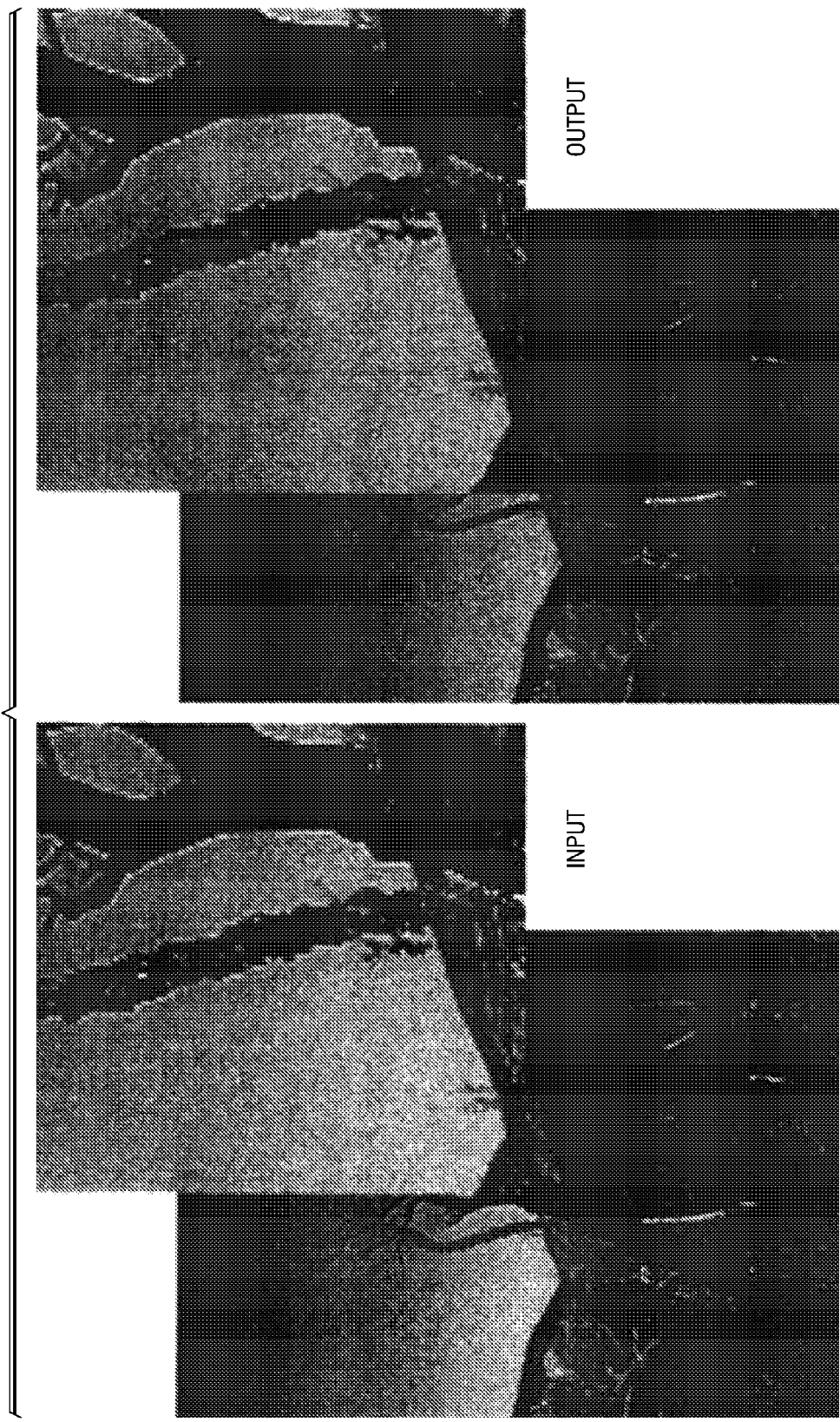
FIG. 5 shows images before and after a low noise filtering.
Figure 6:
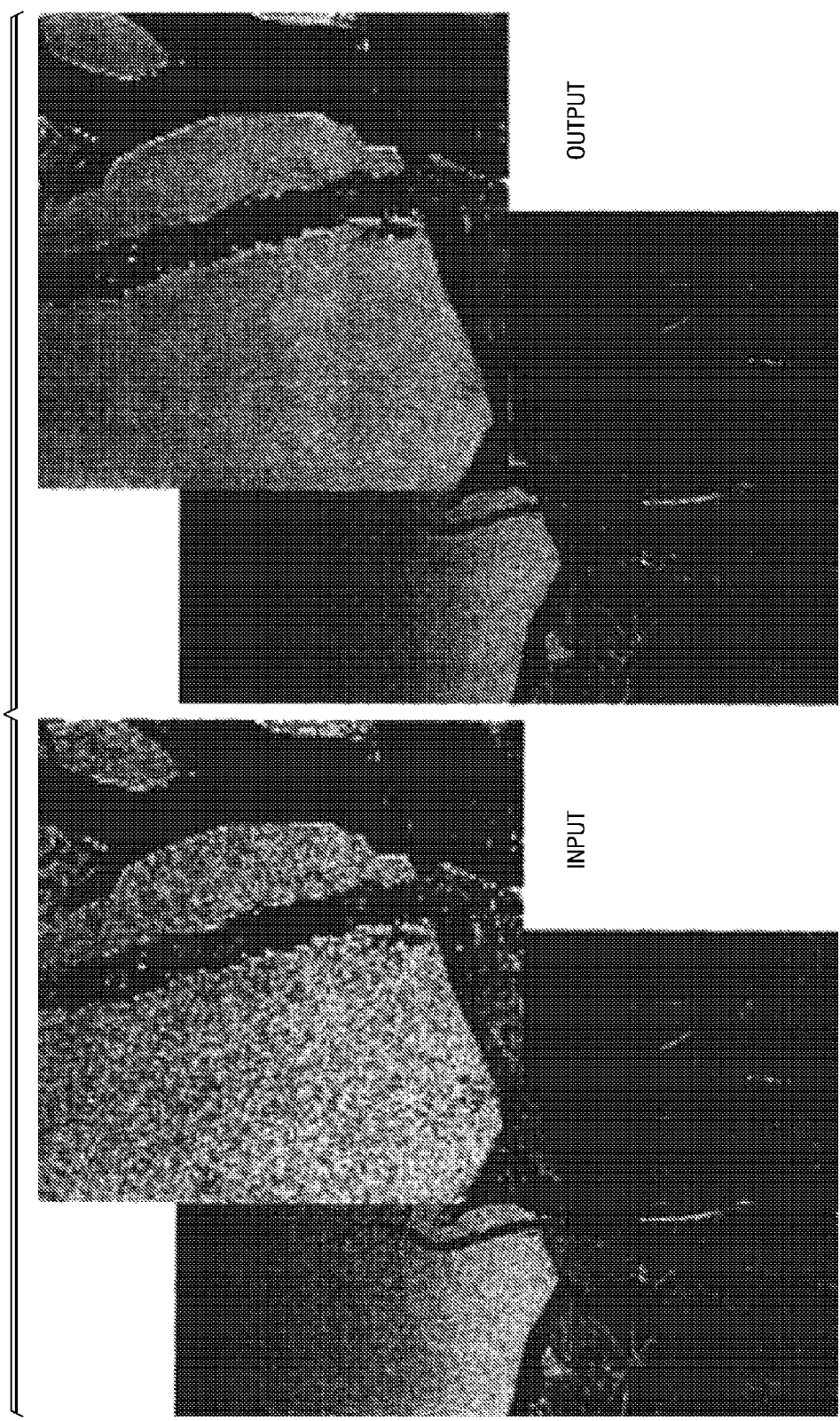
FIG. 6 shows images before and after a medium noise filtering.
Figure 7:
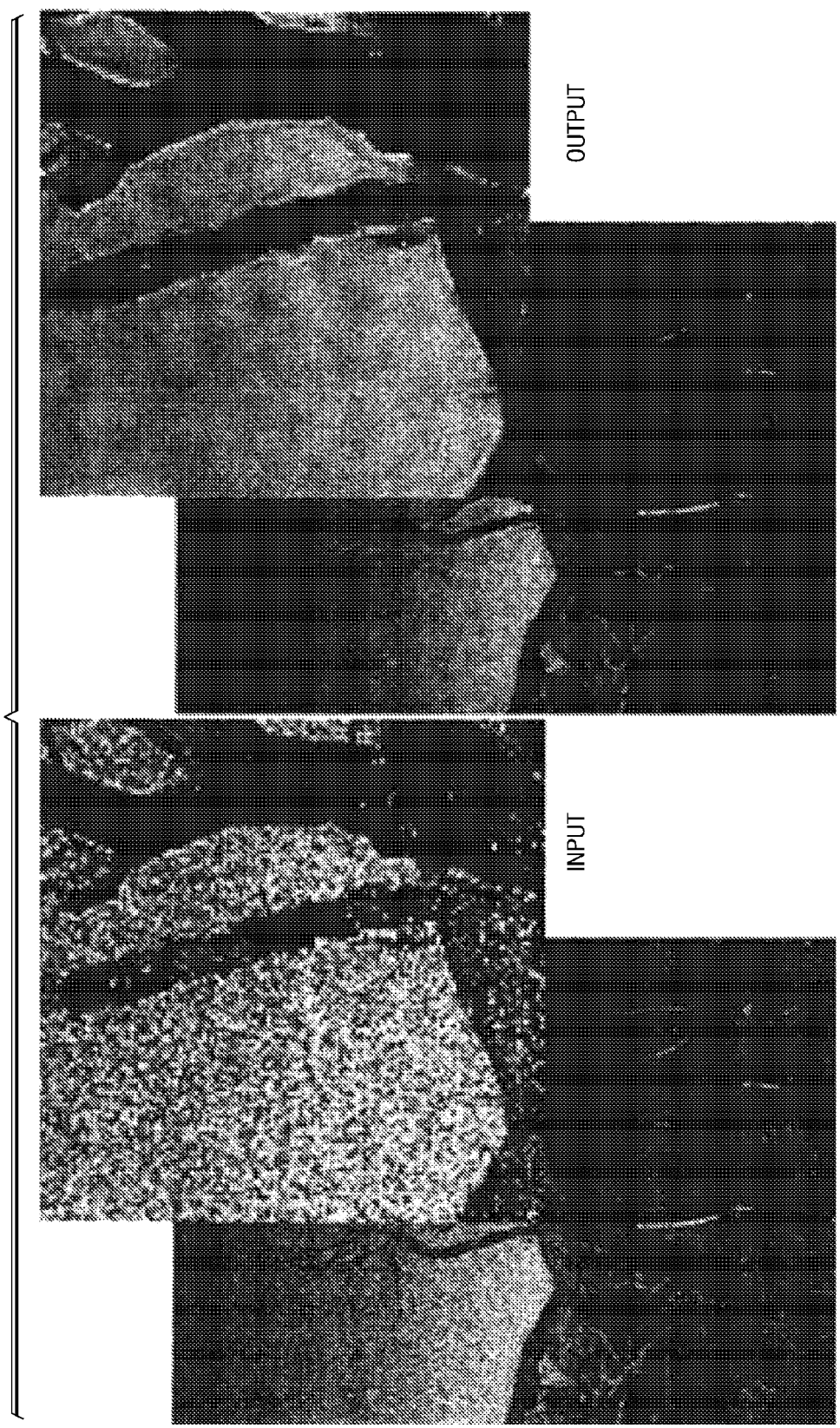
FIG. 7 shows images before and after a high noise filtering.

FIG. 5 shows images with low frequency noises before and after the filtering using the invention; FIG. 6 shows images with medium frequency noises before and after the filtering using the invention; and FIG. 7 shows images with high frequency noises before and after the filtering using the invention.

As mentioned earlier with reference to FIG. 1, a temporal smoothing filter 83 can optionally also be included. Coefficients of the temporal filter can be determined by calculating the difference $f$ between current image frame and previously filtered frame. Specifically, the standard deviation of the Gaussian noise $\sigma_n^2$ is calculated from the previously filtered image frame followed by filtering the previously filtered image frame with a low pass filter so as to reduce remaining noises. A recursive filter based on the absolute of $f$ is assembled with the following characteristics: $T_n = (1-\beta)T_{n-1} + \beta L_n$, wherein $\beta$ is a constant proportional to the absolute difference $f$; $T_n$ is the current output of the filter; $T_{n-1}$ is the filtered image of the previously filtered image; and $L_n$ is the current input image. In an operation when both temporal filter 83 and intensity adaptive smoothing filter 82 (as shown in FIG. 1) are employed, it is preferred that the intensity adaptive smoothing filter 82 be turned on as the difference $f$ increases, where temporal filter effectiveness may be reduced.

Figure 8:
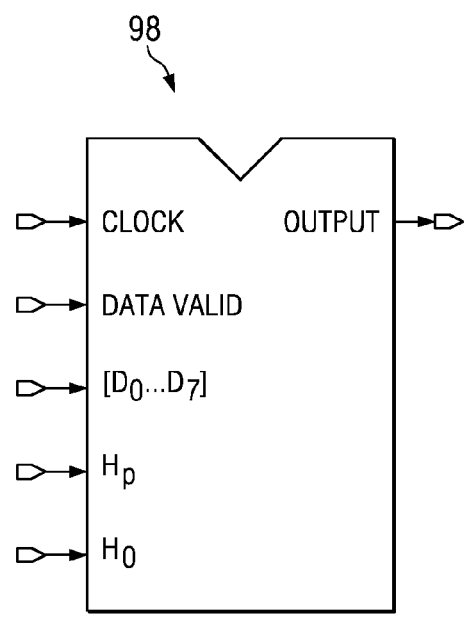
FIG. 8 is a diagram showing an exemplary electronic circuit in which an exemplary method of noise rejection algorithm is implemented.

Examples of the above-described image processing method can be implemented as a stand-alone software module stored in a computer-readable medium having computer-executable instructions for performing the exemplary methods of the invention. Alternatively, examples of the invention can be implemented in a hardware device, such as an electronic device that can be either a stand-alone device or a device embedded in another electronic device or electronic board. FIG. 8 demonstrably illustrates an exemplary electronic chip in which an example of the invention is implemented.

Referring to FIG. 8, electronic chip 98 comprises input pins $H_o$ to $H_p$ for receiving coefficients of the intensity adaptive smoothing filter; an image data pin for receiving image data $[D_o \ldots D_7]$, and control pins for data validity and clock. Processed data is output from pin Output. Alternatively, the electronic chip may provide a number of pins for receiving image data in parallel. The electronic chip can be composed of a field-programmable gate arrays (FPGAs), or an application specific integrated circuit (ASIC).

Figure 9:
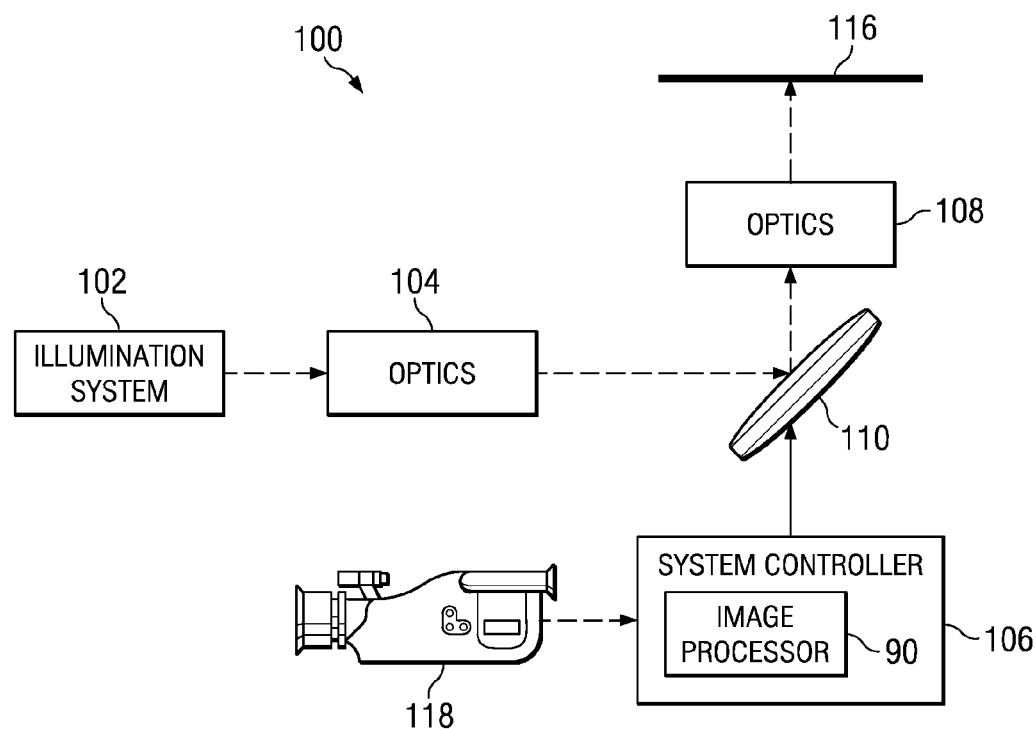
FIG. 9 schematically illustrates an exemplary display system in which an exemplary method of noise rejection algorithm is employed.

Examples of the above-described image processing method have many applications, one of which is in display systems. As an example, a display system employing the intensity adaptive filtering of the invention is demonstratively illustrated in FIG. 9. Referring to FIG. 9, display system 100 comprises illumination system 102 for providing illumination light for the system. The illumination light is collected and focused onto spatial light modulator 110 through optics 104. Spatial light modulator 110 comprises an array of individually addressable pixels, such as micromirror devices, liquid crystal cells, liquid crystal on silicon (LCOS) cells, organic light-emitting diode (OLED) cells, plasma cells or other suitable devices, that modulates the illumination light under the control of system controller 106. The modulated light is collected and projected to screen 116 by optics 108.

The system controller is designated for controlling and synchronizing functional elements of the display system. One of the multiple functions of the system controller is receiving input images (or videos) from an image source 118; and processing the input image. Specifically, the system controller may have image processor 90 in which an electronic chip as shown in FIG. 5 or other examples of the invention are implemented for performing the noise reduction of the input images according to the invention. The processed images are then delivered to spatial light modulator 110 for reproducing the input images.

It will be appreciated by those of skill in the art that a new and useful noise reduction method has been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

We claim:

1. A method for processing a noise contaminated image having an array of image pixels, comprising:
    providing an estimated noise variance floor for the image;
    providing a plurality of directional variance values for each pixel;
    providing a filter having an array of filtering coefficients, wherein a strength of each coefficient is determined based on both a value of an image pixel corresponding to the each filter coefficient relative to a value of an image pixel and an estimated total variance determined by the estimated noise variance floor and the plurality of directional variance values; and
    processing the image pixels with the assembled filter;
    wherein the total variance of the image is estimated from a procedure comprising:
        calculating a directional variance along each of a pre-determined directions;
        finding the minimum variance among the calculated directional variances;

calculating a threshold variance based on the minimum variance; and calculating the total variance from the calculated directional variances that are equal to or less than the threshold.

2. The method of claim 1, wherein the filter is a Gaussian filter.

3. The method of claim 1, wherein a width of a Gaussian distribution function of the Gaussian filter is determined by an estimated total directional variance of the image noise and an estimated noise variance floor.

4. The method of claim 1, wherein the threshold variance is proportional to the minimum variance.

5. The method of claim 1, wherein the step of processing the image pixels with the assembled filter comprises:

applying the filter to the image pixel array using a standard convolution process.

6. The method of claim 5, further comprising:

smoothing the filtered image using a temporal smoothing filter.

7. The method of claim 1, wherein the directional variance and the noise floor are calculated from a luminance component of the image pixels.

* * * * *